(12) United States Patent
Zheng et al.

(10) Patent No.: US 6,819,839 B2
(45) Date of Patent: Nov. 16, 2004

(54) TAPERED WAVEGUIDE PHOTODETECTOR APPARATUS AND METHODS

(75) Inventors: Jun-Fei Zheng, Palo Alto, CA (US); Paul Davids, Portland, OR (US)

(73) Assignee: Intel Corporation, Santa Clara, CA (US)

(*) Notice: Subject to any disclaimer, the term of this patent is extended or adjusted under 35 U.S.C. 154(b) by 64 days.

(21) Appl. No.: 10/201,758

(22) Filed: Jul. 23, 2002

(65) Prior Publication Data

US 2004/0017975 A1 Jan. 29, 2004

(51) Int. Cl.[7] .................... G02B 6/26; H01L 31/0232
(52) U.S. Cl. ................................. 385/43; 257/431
(58) Field of Search ................ 385/43; 257/431–436

(56) References Cited

U.S. PATENT DOCUMENTS

| | | | | |
|---|---|---|---|---|
| 5,910,012 A | * | 6/1999 | Takeuchi | 438/31 |
| 6,310,995 B1 | | 10/2001 | Saini et al. | 385/28 |
| 6,646,317 B2 | * | 11/2003 | Takeuchi | 257/436 |

FOREIGN PATENT DOCUMENTS

| | | | | |
|---|---|---|---|---|
| EP | 0187979 | 12/1985 | ............ | G02B/6/12 |
| EP | 0446056 | 9/1991 | ............ | H01L/27/15 |
| JP | 63-278281 | 11/1988 | ............ | H01L/31/10 |
| JP | 06-204549 | 7/1994 | ............ | H01L/31/10 |

OTHER PUBLICATIONS

Umbach, A., et al., "Waveguide Integrated 1.55μm Photodetector with 45GHz Bandwidth", *Electronics Letters, IEE Stevenage*,32, No. 23, (Nov. 7, 1996), 2143–2145.

* cited by examiner

*Primary Examiner*—Akm Enayet Ullah
*Assistant Examiner*—Michelle R. Connelly-Cushwa
(74) *Attorney, Agent, or Firm*—Schwegman, Lundberg, Woessner & Kluth, P.A.

(57) ABSTRACT

Waveguide photodetector apparatus and methods employing an optical waveguide having a tapered section, which may be horizontally tapered, vertically tapered, or both. The apparatus also includes a photodetector with an intrinsic region, which in one embodiment may be tapered in a manner corresponding to a horizontal taper of the tapered section. The photodetector is arranged adjacent the tapered section such that the intrinsic region is coupled to the optical waveguide via an evanescent wave of a guided lightwave. The tapered section serves to force energy carried in the guided lightwave from the optical waveguide into the intrinsic region of the photodetector via the evanescent wave, thereby shortening the photodetector length.

25 Claims, 8 Drawing Sheets

TAPERED WAVEGUIDE PHOTODETECTOR APPARATUS AND METHODS

TECHNICAL FIELD

The technical field of the invention pertains to photodetectors and, in particular, to waveguide-based high-speed photodetectors.

BACKGROUND INFORMATION

There are many lightwave applications, such as optical telecommunications and chip interconnects, that involve transmitting optical signals and converting them to electrical signals at high data rates. Systems for performing such transmission and conversion usually require a photodetector compatible with the speed and bandwidth of the optical signal. Preferred photodetectors are typically PIN (p-type/intrinsic/n-type) semiconductor (e.g., Si or Ge) detectors, as such detectors can have a fast (i.e., GHz) frequency response.

Certain high-speed photodetectors utilize optical waveguides as a conduit for providing light to the intrinsic region of a PIN photodetector. An optical waveguide is a planar, rectangular or cylindrical structure having a high-index core surrounded by a low-index cladding. Light is trapped in the waveguide mostly within the high-index core, with a small portion of the light propagating in the cladding as an evanescent wave. When the intrinsic region of a PIN photodetector is located sufficiently close to the optical waveguide, light can be coupled to the intrinsic region via the evanescent wave. This phenomenon is referred to as "evanescent coupling."

To form a high-speed waveguide-based photodetector, the light traveling in the optical waveguide must be efficiently coupled to the intrinsic region of the photodetector. This light is then converted to photon-generated carriers, which then diffuse out to the electrodes (i.e., the p+ and n+ regions of the PIN detector). The result is an electrical signal (e.g., a photocurrent) that corresponds to the detected light.

The speed of the detector is related to the time it takes for the photon-generated carriers to reach the electrodes. This time is referred to as the "transit time." The narrower the intrinsic region, the shorter the transit time and the faster the detector. A fast photodetector allows for the detection and processing of high-speed optical signals.

Often, the width and length of the intrinsic region of a photodetector is dictated by the width and length of the waveguide. However, the waveguide is typically designed for optimally transmitting a particular wavelength of light rather than for optimizing the detector speed. For low-index waveguides, the intrinsic region width can be quite wide (e.g., greater than 1 micron) and also quite long (e.g., greater than 50 microns).

The intrinsic region of a PIN detector is typically silicon (Si) or germanium (Ge), both of which have a high refractive index (e.g., about 3.5) as compared to the typical optical waveguide index (e.g., about 1.5 for $SiO_xN_y$). This results in a mismatch between the optical waveguide and the PIN detector with respect to the propagation constant and the waveguide mode of the guided lightwave. This mismatch leads to inefficient optical coupling. In some cases, a relatively lengthy waveguide-detector interface may be used to make up for the coupling inefficiency and to ensure that sufficient light is coupled to the detector. However, a lengthy interface is undesirable because it results in a large detector. Further, in many cases, the interface length needed to make up for the coupling inefficiency is too long for practical purposes.

DETAILED DESCRIPTION

In the following detailed description of the embodiments of the invention, reference is made to the accompanying drawings that form a part hereof, and in which is shown by way of illustration specific embodiments in which the invention may be practiced. These embodiments are described in sufficient detail to enable those skilled in the art to practice them, and it is to be understood that other embodiments may be utilized and that changes may be made without departing from their scope. The following detailed description is, therefore, not to be taken in a limiting sense, and the scope of the present invention is defined only by the appended claims.

Figure 1:
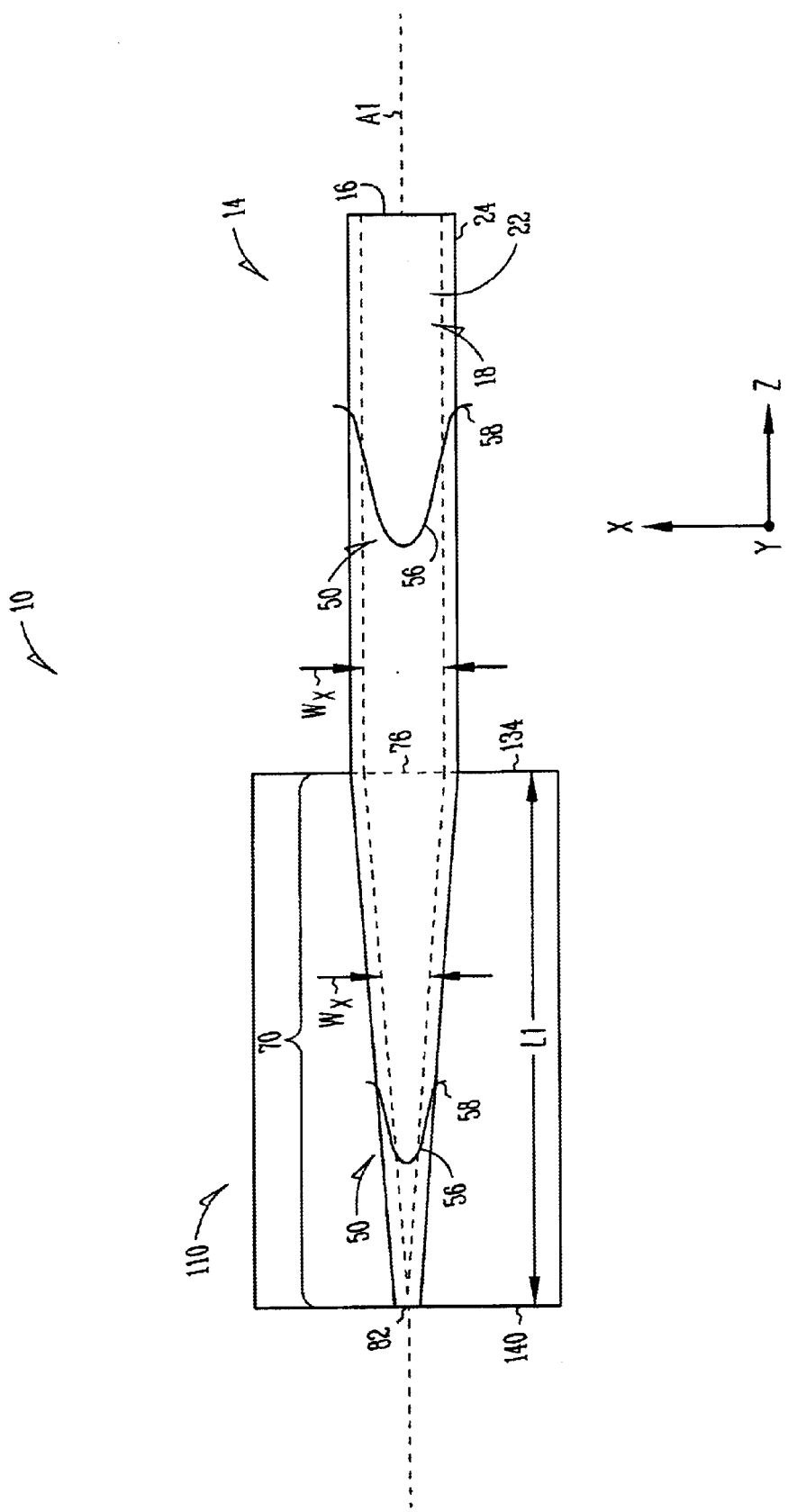
FIG. 1 is a plan view of an embodiment of the photodetector apparatus of the present invention, wherein the optical waveguide has a tapered section with a horizontal taper.

FIG. 1 is a plan view of an embodiment of a photodetector apparatus 10 of the present invention, wherein the optical waveguide 14 has a tapered section 70 with a horizontal taper.

Figure 2:
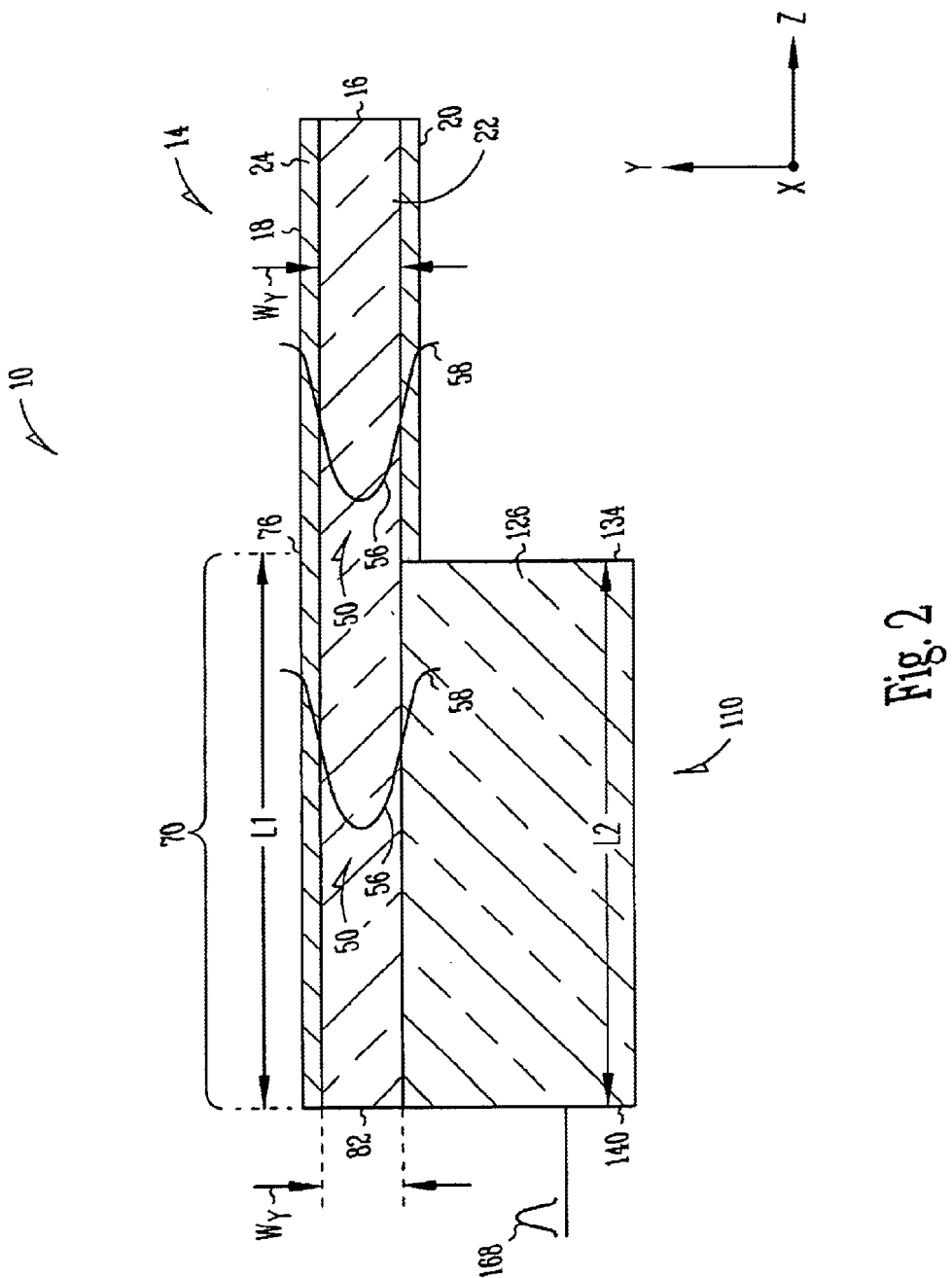
FIG. 2 is a cross-sectional view of the photodetector apparatus of FIG. 1.

FIG. 2 is a cross-sectional view of the photodetector apparatus of FIG. 1. In FIG. 2, the cross-sectional view is taken in the Y-Z plane of FIG. 1 along axis Al.

Referring now to both FIGS. 1 and 2, apparatus 10 includes optical waveguide 14 having an input end 16, an upper surface 18, and a lower surface 20. In an example embodiment, optical waveguide is a rectangular waveguide, as shown. Optical waveguide 14 also includes a core 22 surrounded by a cladding 24. Core 22 has a core width in the X-direction of $W_X$ (FIG. 1) and a core width in the Y-direction of $W_Y$ (FIG. 2). The index of refraction of core 22 is greater than that of cladding 24.

In example embodiments, core 22 is made of $Si_3N_4$ for transmission of light having a wavelength of 850 nm, or it is made of intrinsic silicon for wavelengths of 1 micron or greater. Further in the example embodiments, cladding 24 is made of $SiO_2$, which has a relatively low refractive index (about 1.5) as compared to that of $Si_3N_4$ (about 3.5) at near-infrared and infrared wavelengths. By using materials that provide a large index contrast between the core and the cladding (e.g., $Si_3N_4$ and $SiO_2$, respectively), the core dimensions $W_X$ and $W_Y$ can be made small, e.g., $W_X$, $W_Y$<1 micron.

The high-index-core/low-index-cladding geometry is necessary for optical waveguide 14 to guide a lightwave 50. Lightwave 50 includes a central portion 56 that propagates in core 22 and an evanescent wave 58 that propagates in cladding 24. In an example embodiment, lightwave 50 represents or carries an optical signal.

Optical waveguide 14 further includes a tapered section 70. Tapered section 70 has a length L1 as measured along the Z-direction starting at a point 76 along the waveguide and terminating at a narrow end 82. In the example embodiment of apparatus 10 illustrated in FIG. 1, tapered section 70 is tapered in the horizontal (X-Z) plane and is thus referred to herein as a "horizontal taper."

Figure 3:
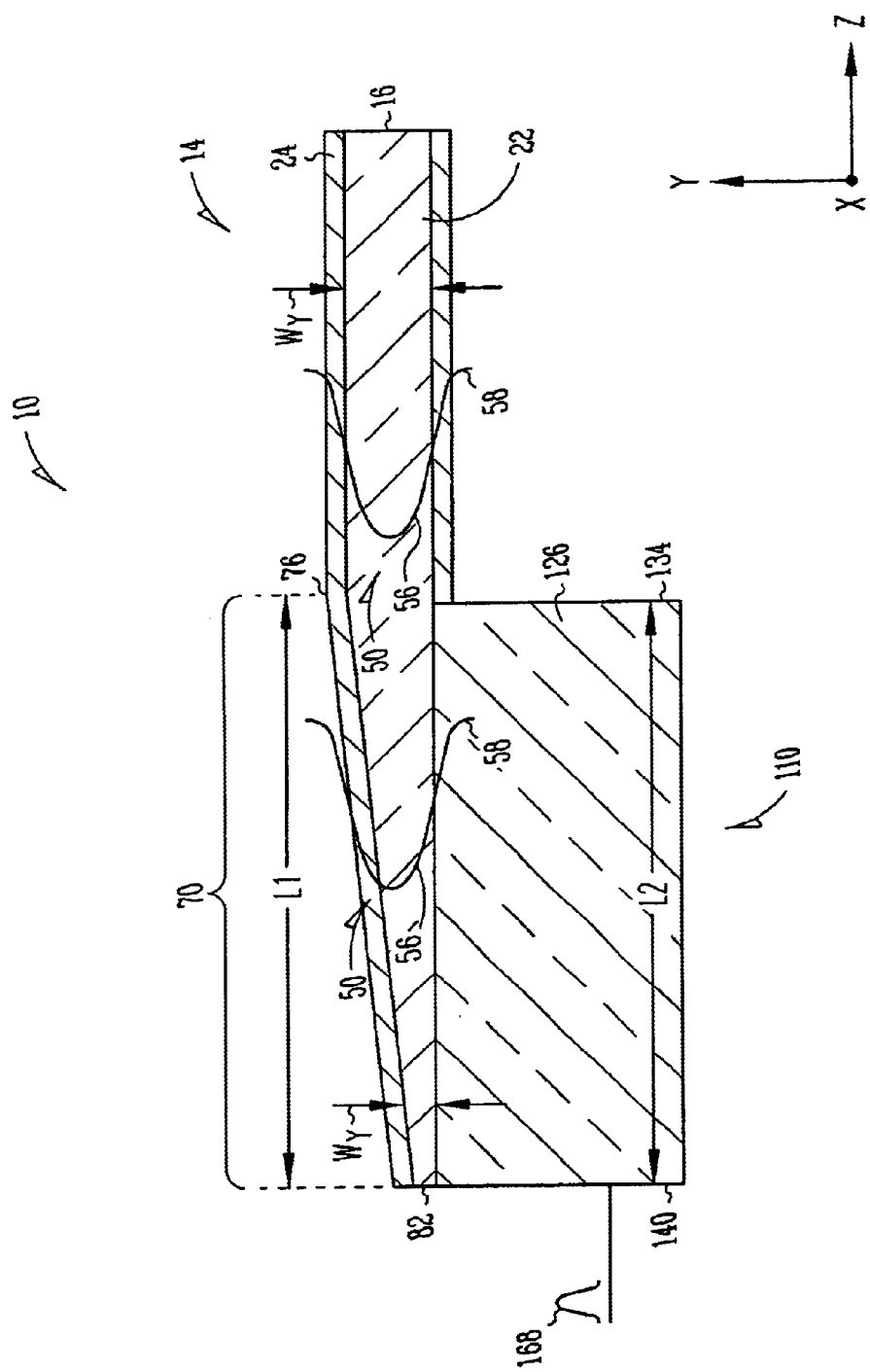
FIG. 3 is a cross-sectional view of a photodetector apparatus similar to that of FIG. 1, except that the optical waveguide tapered section has a vertical taper.

FIG. 3 is a cross-sectional view of a photodetector apparatus 10 similar to that of FIG. 1, except that the optical waveguide tapered section 70 has a vertical taper. This embodiment is referred to herein as a "vertical taper."

Figure 4:
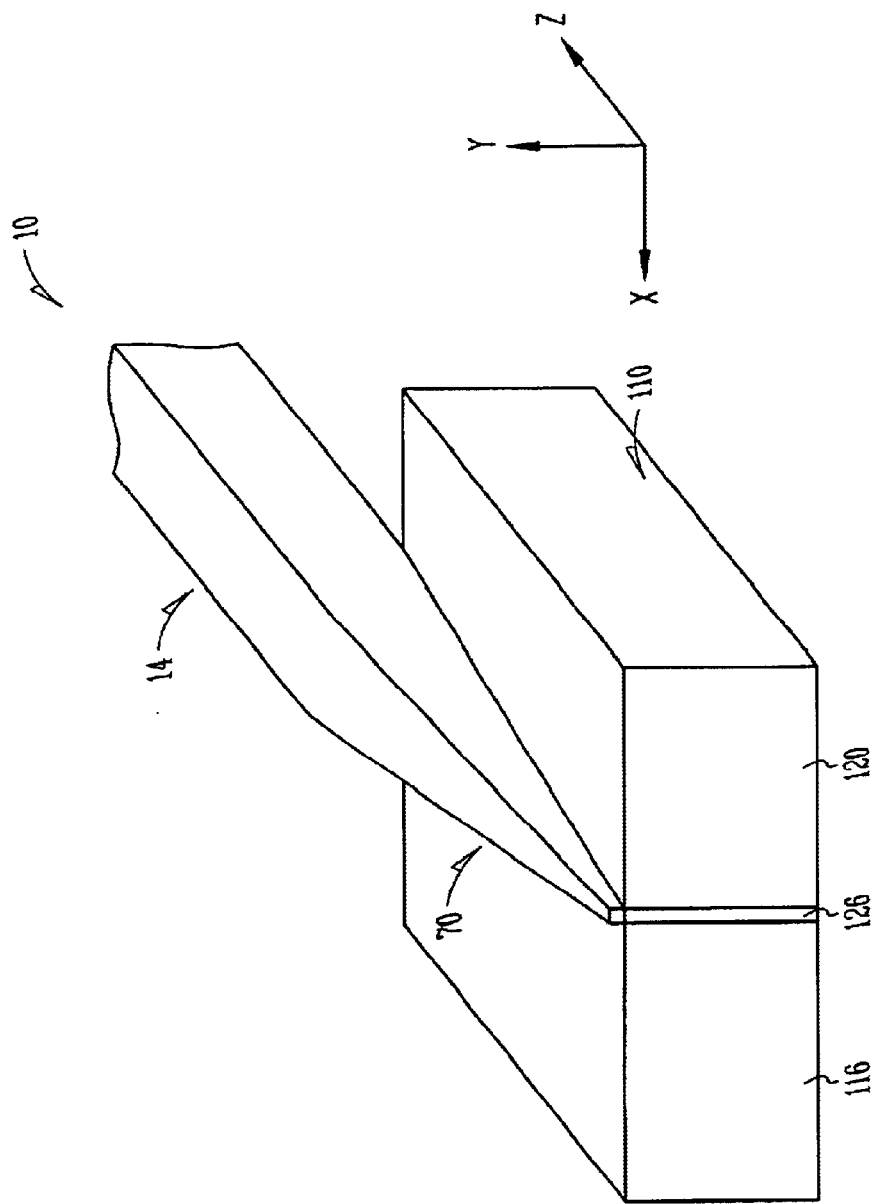
FIG. 4 is a perspective end view of a photodetector similar to that of the embodiment shown in FIG. 1, except that the optical waveguide tapered section has a vertical and horizontal (i.e., "double") taper.

FIG. 4 is a perspective end view of a photodetector 110 similar to that of the embodiment shown in FIG. 1, except that the optical waveguide tapered section has a vertical and horizontal (i.e., "double") taper. This embodiment is referred to herein as a "double taper."

The role of tapered section 70 in its various forms is discussed in greater detail below. For the sake of illustration, the discussion below continues with the horizontal taper example embodiment of apparatus 10 as shown in FIG. 1

Figure 5:
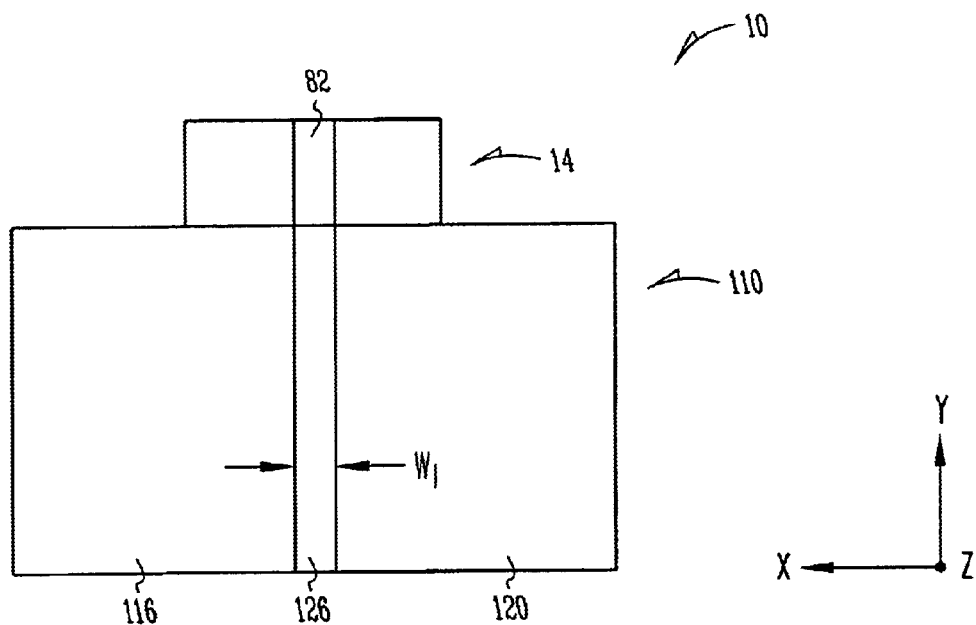
FIG. 5 is an end-view of the photodetector apparatus of FIG. 1.

FIG. 5 is an end-view of the photodetector apparatus 10 of FIG. 1. Apparatus 10 further includes a PIN photodetector 110 having opposing p-type and n-type electrodes 116 and 120 separated by an intrinsic region 126. Intrinsic region 126 is made from a semiconductor material, and in example embodiments it comprises either silicon or germanium. Intrinsic region 126 has a width $W_I$ as well as a length L2 as measured between a leading end 134 and a terminating end 140 (FIG. 2). In an example embodiment, width $W_I$ is variable.

PIN photodetector 110 is arranged adjacent core 22 so that waveguide 14 and intrinsic region 126 optically communicate via evanescent wave 58. In other words, the waveguide and intrinsic region of the PIN detector are evanescently coupled. In an example embodiment, width $W_I$ of intrinsic region 126 corresponds to core width $W_X$ of waveguide 110, which can be constant (e.g., for a vertical taper) or variable (e.g, for a horizontal taper). Further, in an example embodiment, instrinsic region width $W_I$ is equal to or substantially equal to core width $W_X$. In yet another example embodiment, intrinsic region length L2 is equal to or substantially equal to the tapered section length L1.

In an example embodiment, intrinsic region 126 is formed beneath waveguide 14 in combination with the self-aligned formation of p-type and n-type electrodes 116 and 120, formed with respect to waveguide core 22.

Figure 6:
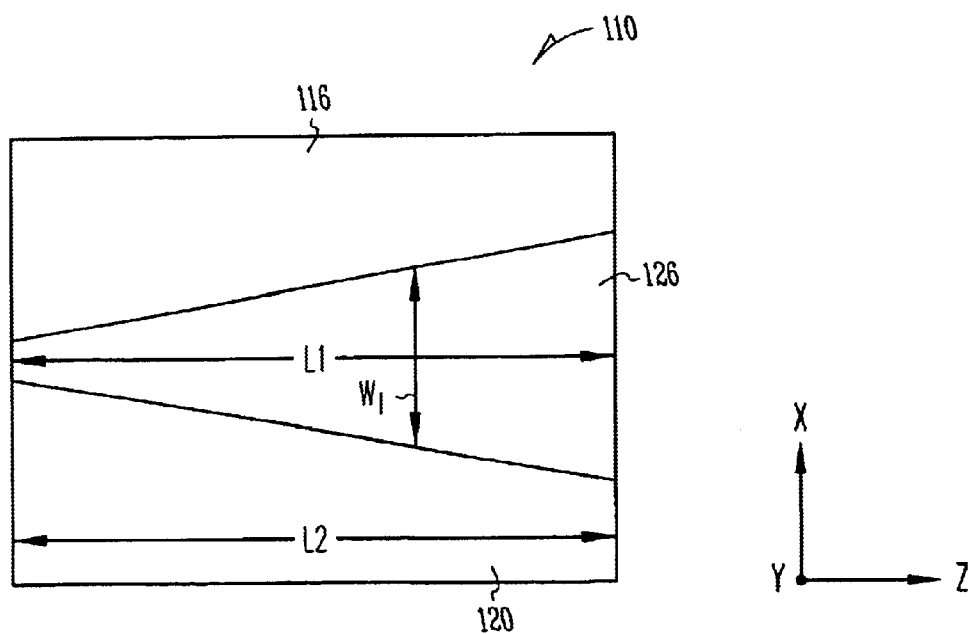
FIG. 6 is a close-up plan view of an example embodiment of a PIN photodetector having a tapered intrinsic region.

FIG. 6 is a close-up plan view of an example embodiment of a PIN photodetector having a tapered intrinsic region 126. A tapered intrinsic region is most appropriate when tapered section 70 (FIGS. 1–4) includes a horizontal taper. In an example embodiment, tapered intrinsic region 126 matches the taper of tapered section 70 of waveguide 14 (FIGS. 1–4). In an example embodiment, the p-type and n-type electrodes 116 and 120 are shaped to accommodate a tapered intrinsic region 126.

In operation, referring to FIGS. 1–3, lightwave 50 is inputted into input end 16 of optical waveguide 14 and propagates down the waveguide. Eventually, lightwave 50 reaches starting point 76 of tapered section 70, which in an example embodiment is also the location of leading end 134 of photodetector 110. At this point, evanescent wave 58 of lightwave 50 evanescently couples to intrinsic region 126 (FIGS. 2–6), and light (energy) is transferred to the intrinsic region 126. To facilitate the coupling, in an example embodiment intrinsic region 126 is intimately contacted directly to core 22 in tapered section 70 (FIGS. 2–3).

Still referring to FIGS. 1–3, lightwave 50 continues propagating towards narrow end 82 of tapered section 70 as power is coupled to the intrinsic region. For a purely horizontal taper (e.g. FIGS. 1–2), the core diminishes in size from point 76 to narrow end 82 only in the X-direction (i.e., core width $W_X$ varies in the Z-direction, while core width $W_Y$ remains constant). For a purely vertical taper (e.g. FIG. 3), the core diminishes in size only in the Y-direction while the core width $W_X$ remains constant.

Referring to FIG. 4, for a combination vertical and horizontal (i.e., a double) taper, the core diminishes in size in both the horizontal and vertical directions, so that core widths $W_X$ and $W_Y$ (not shown in FIG. 4) both vary in the Z-direction.

Referring once again to FIGS. 1–3, the reduction in the size of core 22 in tapered section 70 causes the energy carried in lightwave 50 to spread out from central portion 56 into evanescent wave 58. The increase in energy in the evanescent wave leads to more and more energy being coupled into intrinsic region 126 from lightwave 50. Thus, as lightwave 50 continues propagating through tapered section 70 toward narrow end 82, more and more energy from the lightwave is evanescently coupled into intrinsic region 126. The coupled light energy creates photon-generated carriers in intrinsic region 126, which diffuse to the electrodes 116 and 120 (FIGS. 4 and 5), creating an electrical signal 168, such as a photocurrent.

Still referring to FIGS. 1–3, tapered section 70 is designed such that when lightwave 50 reaches narrow end 82, the amount of energy left in the lightwave is negligible. This is to prevent energy from being reflected backwards and traveling back up optical waveguide 14. Also, in an example embodiment, the degree of taper of tapered section 70 is selected such that the transfer of energy from waveguide 14 to intrinsic region 126 is adiabatic, i.e., occurs with minimal reflection or loss of energy other than the evanescent coupling to the intrinsic region. The optimal design of tapered section 70 for a given set of parameters (e.g., wavelength of light, desired length of intrinsic region, relative indices of refraction of the core, cladding and intrinsic region, etc.) can be accomplished by computer modeling using commercially available simulation software. An example of such simulation software is the rSoft BPM simulator, currently available from rsoft, Inc., at www-rsoft-com (to avoid inadvertent hyperlinks the periods in the preceding URL have been replaced by dashes).

Thus, tapered section 70 makes for efficient optical coupling by forcing the energy in lightwave 50 into intrinsic region 126. This allows length L2 (FIGS. 2–3) of intrinsic region 126 to be shorter than if tapered section 70 were not present. This in turn makes for a more compact and efficient photodetector apparatus.

Figure 7A:
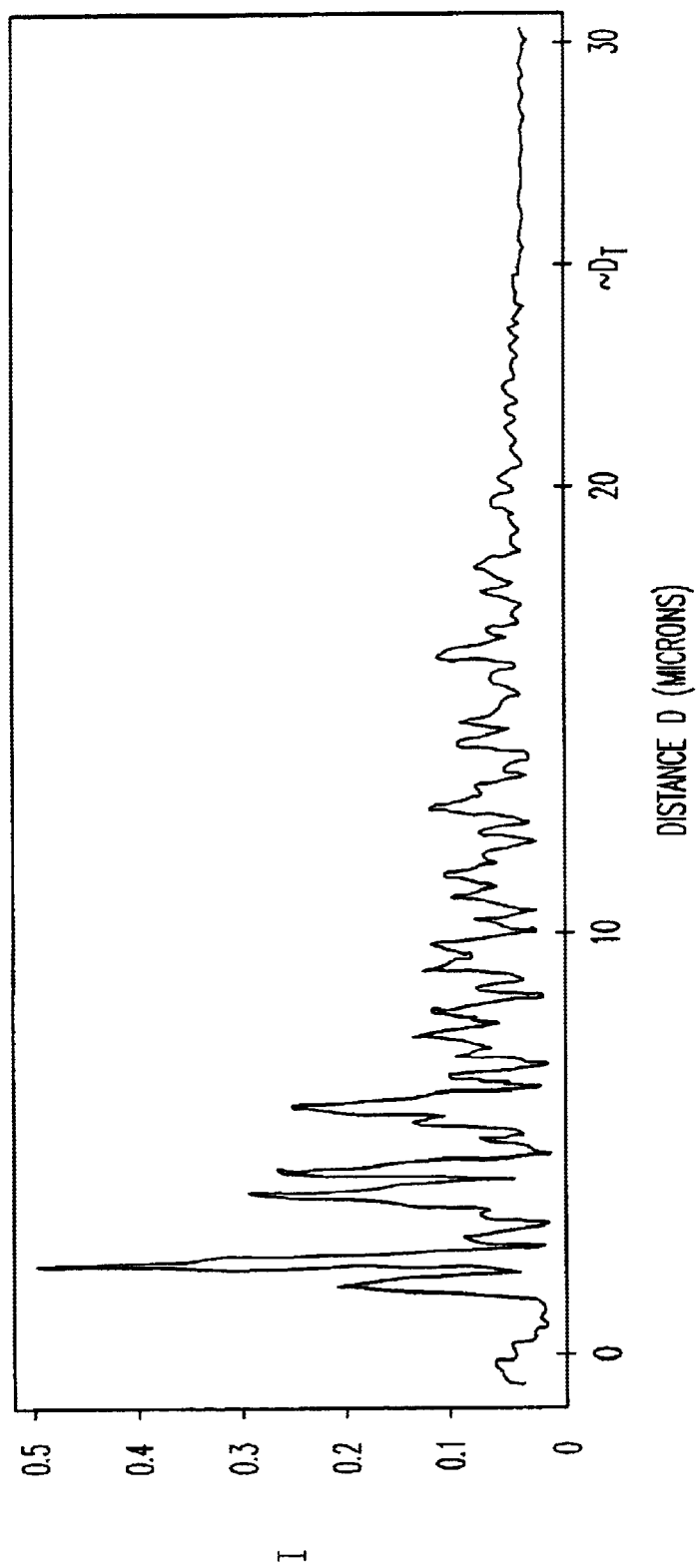
FIG. 7A is a plot based on a simulation of the time-averaged intensity I (arbitrary units) of the light coupled into the intrinsic region of a PIN detector versus the distance D (microns) along the intrinsic region for a photodetector apparatus similar to that of FIG. 1, but without a tapered waveguide section.

FIG. 7A is a plot based on a simulation of the time-averaged intensity I (arbitrary units) of the light coupled into the intrinsic region of a PIN detector versus the distance D (microns) along the intrinsic region for a photodetector apparatus similar to that of FIG. 1, but without a tapered waveguide section.

Figure 7B:
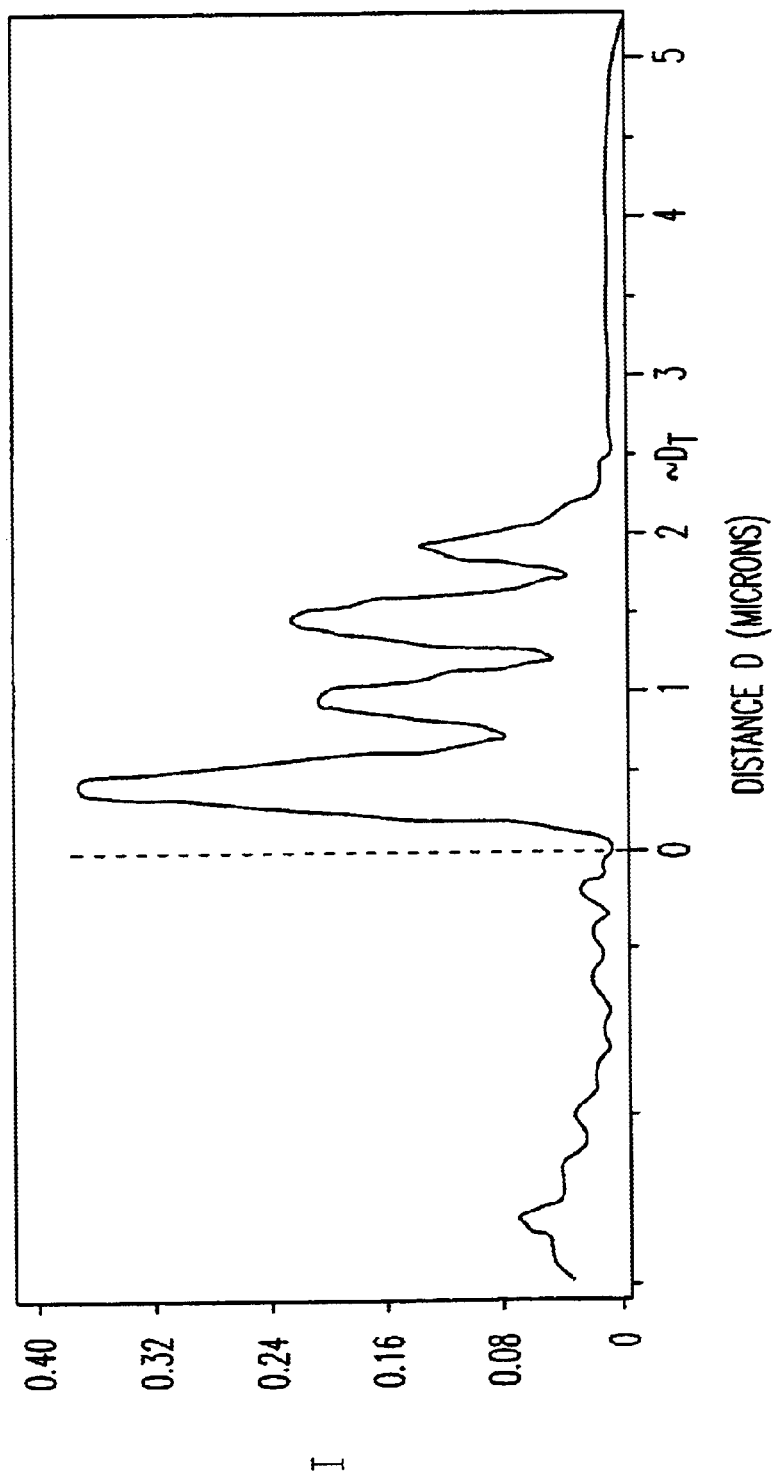
FIG. 7B is a plot similar to FIG. 7A, except that the photodetector apparatus includes a horizontal tapered section.

FIG. 7B is a plot similar to FIG. 7A, except that the photodetector apparatus includes a horizontal tapered section.

In FIGS. 7A and 7B, the distance required to transfer substantially all of the energy from guided lightwave 50 (e.g. in FIG. 2) to intrinsic region 126 (e.g. in FIG. 2) is referred to herein as the "energy transfer distance" and is denoted $D_T$. The rsoft BPM simulator referred to above was used to perform the simulations to obtain the data for the plots.

From FIG. 7A, it is seen that the energy transfer distance $D_T$ for the "no taper" case is about 25 microns. On the other hand, from FIG. 7B, it is seen that the energy transfer distance $D_T$ for the horizontal taper case is about 2.5 microns. Thus, use of a horizontal tapered section 70 in apparatus 10 can result in a very large (i.e., about an order of magnitude) reduction in the energy transfer distance $D_T$. Similar results can be obtained for the vertical and double taper embodiments. As a consequence, the PIN detector section of apparatus 10 can be made almost two orders of magnitude smaller than prior art apparatus.

Besides increasing the coupling efficiency and reducing the energy transfer distance $D_T$, an increase in detection speed can be realized with embodiments of apparatus 10, particularly those embodiments having a horizontal taper component in tapered section 70. As discussed above in connection with FIG. 6, a horizontal component to tapered section 70 allows for intrinsic region 126 to be correspondingly tapered so that the intrinsic region is, on the average, narrower then a conventional intrinsic region. This results in a shorter distance between the p-type and n-type electrodes 116 and 120 as compared to a conventional PIN. This, in turn, translates into a shorter transit time for photon-generated carriers and thus a faster detector speed.

Electrical-Optical System

Figure 8:
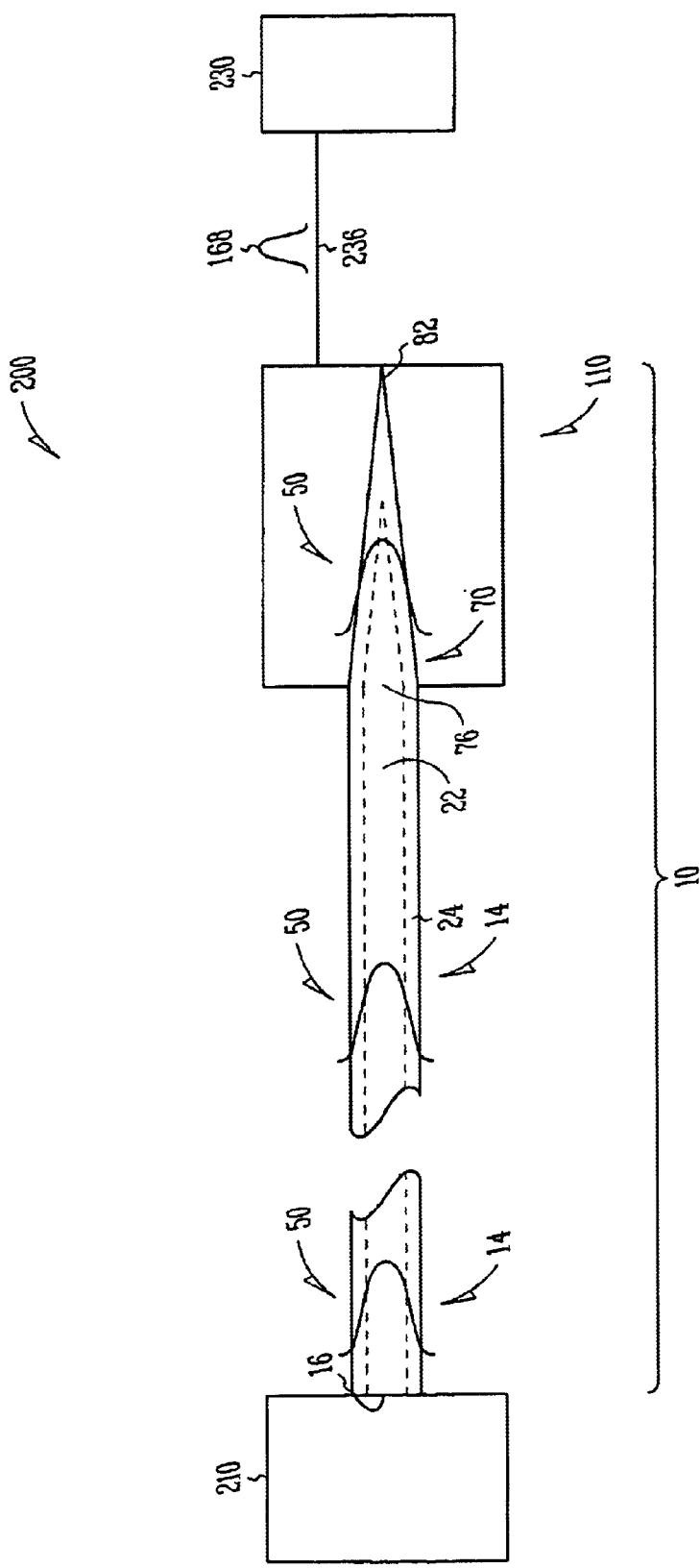
FIG. 8 is a schematic diagram of an embodiment of an electrical-optical system that employs any one of the embodiments of the photodetector apparatus of the present invention.

FIG. 8 is a schematic diagram of an embodiment of an electrical-optical system 200 that employs any one of the embodiments of photodetector apparatus 10 of the present invention. System 200 includes an optical or opto-electronic device 210 optically coupled to optical waveguide 14 at input end 16. Device 210 is capable of generating an optical signal carried by or otherwise represented by lightwave 50. In an example embodiment, device 210 includes a microprocessor (not shown) and a light-emitting device (not shown) such as a diode laser or a light-emitting diode.

System 200 further includes an electronic or optoelectronic device 230 electrically coupled to photodetector 110 via a wire 236. Device 230 is any device capable of receiving and processing electrical signal 168, such as but not limited to, for example, a microprocessor, a filter, an amplifier, or any combination thereof. Device 230 could include any other type of signal-processing element or circuit.

In operation, device 210 emits an optical signal represented by or carried by lightwave 50, which is coupled into optical waveguide 14. Lightwave 50 propagates in waveguide 14 to tapered section 70. In tapered section 70, the energy in lightwave 50 is forced by the taper into intrinsic region 126 (refer to FIGS. 2, 3, 5, and 6) of photodetector 110 as the lightwave continues propagating toward narrow end 82. The light in intrinsic region 126 is converted to photon-generated carriers, which diffuse to electrodes 116 and 120 (refer to FIGS. 4–6), resulting in electrical signal 168. Electrical signal 168 is then carried by wire 236 to device 230, which then processes the electrical signal.

The various elements depicted in the drawings are merely representational and are not drawn to scale. Certain proportions thereof may be exaggerated, while others may be minimized. The drawings are intended to illustrate various implementations of the invention, which can be understood and appropriately carried out by those of ordinary skill in the art.

While certain elements have been described herein relative to "upper" and "lower", and "horizontal" and "vertical", it will be understood that these descriptors are relative, and that they could be reversed if the elements were inverted, rotated, or mirrored. Therefore, these terms are not intended to be limiting.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment.

While the present invention has been described in connection with preferred embodiments, it will be understood that it is not so limited. On the contrary, it is intended to cover all alternatives, modifications and equivalents as may be included within the spirit and scope of the invention as defined in the appended claims.

What is claimed is:

1. An apparatus comprising:
   an optical waveguide having a tapered section; and
   a photodetector with an intrinsic region, the photodetector arranged adjacent the tapered section such that the intrinsic region is optically coupled to the optical waveguide via lateral evanescent coupling.

2. The apparatus of claim 1, wherein the tapered section includes a horizontal taper.

3. The apparatus of claim 2, wherein the intrinsic region is tapered corresponding to the horizontal taper of the tapered section.

4. The apparatus of claim 2, wherein the tapered section includes a vertical taper.

5. The apparatus of claim 1, wherein the tapered section includes a vertical taper.

6. The apparatus of claim 1, wherein the tapered section has a first length, and wherein the intrinsic region has a second length substantially equal to the first length.

7. An apparatus comprising:
   a photodetector having opposing p-type and n-type electrodes separated by an intrinsic region; and
   an optical waveguide having a core and a tapered section, with the tapered section arranged adjacent the intrinsic region such that the core and intrinsic region are laterally evanescently coupled.

8. The apparatus of claim 7, wherein the tapered section includes at least one of a horizontal taper and a vertical taper.

9. The apparatus of claim 8, wherein the tapered section includes a horizontal taper, and the intrinsic region is tapered.

10. The apparatus of claim 9, wherein the n-type and p-type electrodes are tapered to accommodate the tapered intrinsic region.

11. A system comprising:
   a photodetector apparatus having an optical waveguide with a tapered section, the optical waveguide to support a lightwave, and a photodetector with an intrinsic region, wherein the intrinsic region is arranged adjacent the tapered section and is laterally evanescently coupled thereto, the photodetector capable of generating an electrical signal in response to light evanescently coupled to the intrinsic region from the lightwave;
   a first device capable of generating the lightwave and coupled to an input end of the optical waveguide; and
   a second device electrically coupled to the photodetector and capable of receiving and processing the electrical signal.

12. The system of claim 11, wherein the tapered section includes at least one of a horizontal taper and a vertical taper.

13. The system of claim 12, wherein the tapered section includes a horizontal taper and wherein the intrinsic region is tapered.

14. The system of claim 12, wherein the intrinsic region comprises silicon.

15. The system of claim 12, wherein the intrinsic region comprises germanium.

16. A method comprising:
   guiding a lightwave in an optical waveguide having a tapered section; and
   laterally evanescently coupling the lightwave to an intrinsic region of a photodetector adjacent the tapered section.

17. The method of claim 16, further comprising generating the lightwave with a first device optically coupled to an input end of the waveguide.

18. The method of claim 17, further comprising generating an electrical signal with the photodetector.

19. The method of claim 18, further comprising receiving and processing the electrical signal with a second device electrically coupled to the photodetector.

20. The method of claim 16, further comprising providing the tapered section with at least one of a horizontal taper and vertical taper.

21. A method comprising:
   propagating a lightwave in an optical waveguide having a tapered section; and
   detecting the lightwave in a photodetector adjacent the tapered section by laterally evanescently coupling light from the tapered section to an intrinsic region of the photodetector.

22. The method of claim 21, further comprising forming the tapered section to have a horizontal taper.

23. The method of claim 21, further comprising forming the tapered section to have a vertical taper.

24. The method of claim 21, further comprising forming the tapered section to have both a vertical and horizontal taper.

25. The method of claim 21, further comprising:
   generating an electrical signal in response to detecting the lightwave; and
   processing the electrical signal with a device electrically coupled to the photodetector.

* * * * *